(12) United States Patent
Chung et al.

(10) Patent No.: US 9,184,997 B2
(45) Date of Patent: Nov. 10, 2015

(54) SELECTIVE NETWORK MERGING

(71) Applicant: Brocade Communications Systems, Inc., San Jose, CA (US)

(72) Inventors: Daniel Ji Yong Park Chung, San Jose, CA (US); Hung Quoc Nguyen, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/320,758

(22) Filed: Jul. 1, 2014

(65) Prior Publication Data

US 2014/0313934 A1    Oct. 23, 2014

Related U.S. Application Data

(62) Division of application No. 12/610,044, filed on Oct. 30, 2009, now Pat. No. 8,817,804.

(51) Int. Cl.
*H04L 12/24* (2006.01)
*H04L 29/12* (2006.01)
*H04L 29/08* (2006.01)
*H04L 12/54* (2013.01)
*H04L 12/931* (2013.01)

(52) U.S. Cl.
CPC ............ *H04L 41/0893* (2013.01); *H04L 41/12* (2013.01); *H04L 61/6045* (2013.01); *H04L 67/1097* (2013.01); *H04L 12/5696* (2013.01); *H04L 49/357* (2013.01)

(58) Field of Classification Search
None
See application file for complete search history.

(56) References Cited

U.S. PATENT DOCUMENTS

| 7,742,484 | B2 | 6/2010 | Makishima |
| 7,936,769 | B2 | 5/2011 | Chung |
| 2002/0161871 | A1 | 10/2002 | Shanthaveeraiah |
| 2003/0095549 | A1 | 5/2003 | Berman |
| 2006/0023707 | A1 | 2/2006 | Makishima |
| 2006/0023725 | A1 | 2/2006 | Makishima |
| 2006/0023726 | A1* | 2/2006 | Chung et al. .................. 370/398 |
| 2010/0153975 | A1 | 6/2010 | Zwisler |
| 2011/0216778 | A1 | 9/2011 | Chung |

* cited by examiner

*Primary Examiner* — Faruk Hamza
*Assistant Examiner* — Cassandra Decker
(74) *Attorney, Agent, or Firm* — Blank Rome, LLP (57) ABSTRACT

Subsets of isolated communications networks are selectively merged without merging the entire isolated communications networks, and devices are imported across isolated communications networks without merging the isolated communications networks. The presently disclosed technology provides for improved scalability, performance, and security in logical networks spanning two or more physical communications networks.

16 Claims, 5 Drawing Sheets

SELECTIVE NETWORK MERGING

CROSS-REFERENCE TO RELATED APPLICATIONS

This application is a divisional of U.S. application Ser. No. 12/610,044, filed Oct. 30, 2009, which is specifically incorporated by reference for all that it discloses and teaches.

This application is related to U.S. patent application Ser. No. 10/903,499, now U.S. Pat. No. 7,466,712, entitled "System and Method for Providing Proxy and Translation Domains in a Fibre Channel Router," filed on Jul. 30, 2004, which is specifically incorporated by reference for all that it discloses and teaches.

BACKGROUND

Communications networks, including without limitation wide area networks ("WANs"), local area networks ("LANs"), and storage area networks ("SANs"), may be implemented as a set of interconnected switches that connect a variety of network-connected nodes to communicate data, share hardware resources, and/or control packets among the nodes and switches. For example, a SAN may be implemented as a high-speed, special purpose network that interconnects different kinds of data storage devices with associated data servers on behalf of a large network of users. Typically, a SAN includes high performance switches as part of an overall network of computing resources for an enterprise. A SAN may be clustered in close geographical proximity to other computing resources, such as mainframe computers, but may also extend to remote locations, such as other enterprise sites, for backup and archival storage using wide area network carrier technologies. Data storage devices and data servers may be collectively referred to as "nodes" connected to the network.

A SAN is often used if a particular application requires SAN capabilities, so a small, isolated SAN is developed for that particular application. In many cases, a different department or application within an organization will need a SAN and will have a SAN developed for that department or application, as well. The development of multiple isolated SANs, however, may waste valuable resources because the SANs do not share any resources. Thus, in some situations it would be desirable to have connectivity between these isolated SANs to provide overall management and to provide more efficient and scalable use of various resources while still maintaining separate fabrics or networks.

Fibre Channel networking is typically used in SANs although other communications technologies may also be employed, including Ethernet and IP-based storage networking standards (e.g., iSCSI, FCIP (Fibre Channel over IP), etc.). As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices. Other networking protocols may additionally or alternatively be employed, such as raw Ethernet, TCP/IP, USP, etc.

As a Fibre Channel fabric (FCF) develops and grows in size, the stability of the Fibre Channel fabric may be reduced when an event occurs. In addition, when a Fibre Channel fabric is formed of various types of devices, it becomes increasingly difficult to maintain the scalability and performance of the fabric.

Logical networks, such as Logical Storage Area Networks (LSANs), can be created to share resources between two or more communications networks, such as FCFs. These logical networks are typically administered by zoning, in which a logical zone defining the devices to be shared is created in each isolated communication network, and a network switch attached to the two or more isolated networks "listens" for the creation of "matching" zones on the attached networks. The creation and administration of logical networks spanning multiple isolated communications networks, however, is resource intensive and may compromise scalability, performance, and security of the logical network.

Additionally, hardware and protocol requirements make some devices in large communications networks sensitive to timeout and retry during discovery processes.

SUMMARY

Implementations described and claimed herein relate to providing selective connectivity between subsets of isolated communications networks, based on an enforce tag. More specifically, these subsets of isolated communications networks may be selectively merged without merging the entirety of each of the isolated communications networks.

Further, the presently disclosed technology is capable of expediting the importation of devices associated with different isolated communications networks. The importation will persist unless the imported device is taken off-line.

Other implementations are also described and recited herein.

DETAILED DESCRIPTIONS

The presently disclosed technology provides for improved scalability, performance, and security in logical networks spanning two or more physical communications networks. While the presently disclosed technology is described in the context of a Storage Area Network (SAN) environment, it should be understood that the described technology may also be applied outside of a SAN environment, such as a strictly LAN or WAN communications environment. Additionally, it should be understood that the described technology is not limited to Fibre Channel routers (FCRs) or Fibre Channel protocol and may be applied to any network switching device or any protocol in which communication is desirable between isolated communications networks.

Tagging may be used to set policies for efficient, scalable, and secure network interconnection. More specifically, an "enforce" tag provides for the creation of a logical network by configuring a network switch for selective acceptance of zones from isolated communications networks connected to the network switch. A "speed" tag provides for expedited importation of devices from other isolated communications networks connected to a network switch. In an implementation, tags are configured in network switch devices.

Figure 1:
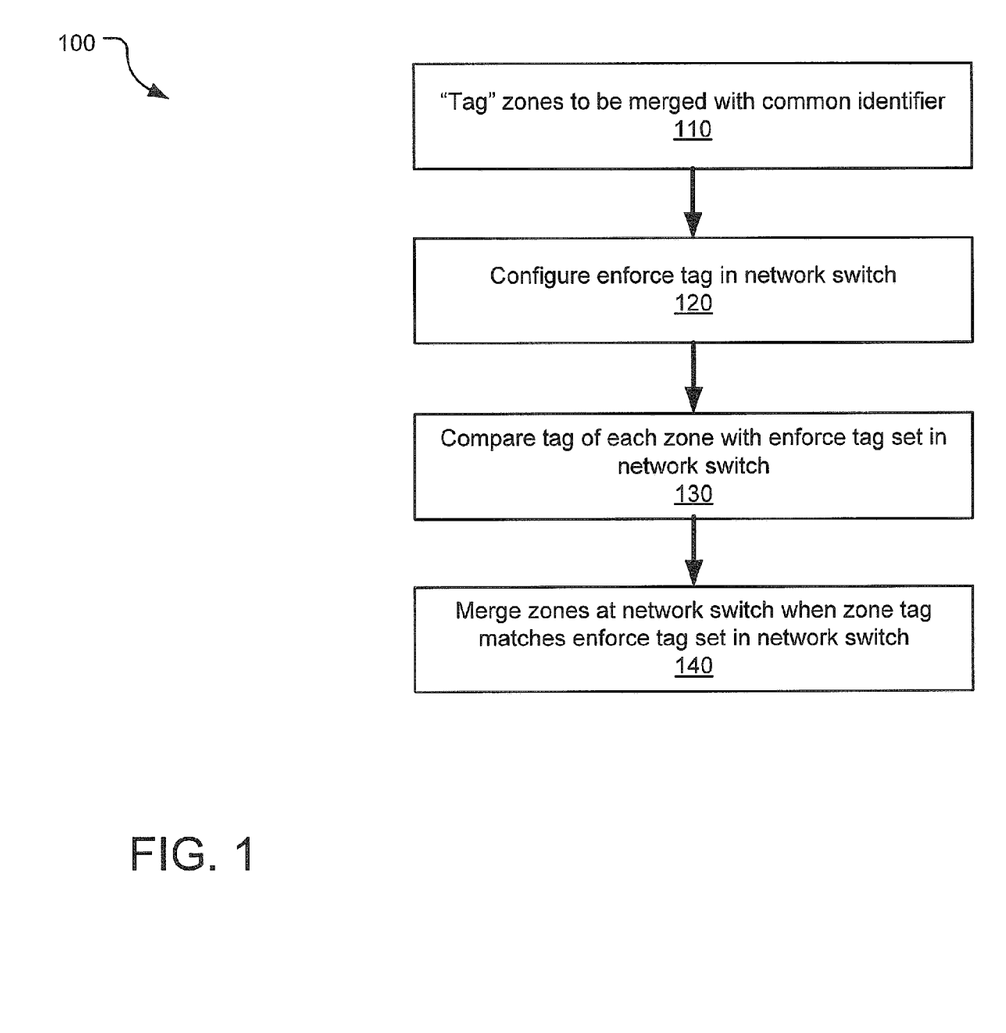
FIG. 1 illustrates example operations for selectively merging selected subsets of isolated networks using an enforce tag.

FIG. 1 illustrates example operations 100 for selectively merging selected subsets of isolated networks using an enforce tag. A tagging operation 110 identifies zones or subsets of each of the isolated networks that are desired to be merged, and "tags" those zones or subsets by providing them with a common name. More specifically, an administrative station may be used to provide zones or subsets with user-defined names stored in a database that stores all of the zone information for that isolated network.

A configuration operation 120 configures the enforce tag in the network switch to enforce the tagged zones at the network switch. In the configuration operation 120, an administrative station or other network switch configuration tool may be used to define those tags that the network switch will accept.

A comparison operation 130 compares the tag of each subset or zone with the enforce tag set in the network switch. This comparison occurs as the network switch parses databases containing zone information for each of the isolated networks connected to the network switch.

A merge operation 140 selectively merges those zones parsed by the network switch when the tag of the zone matches the enforce tag set in the network switch. In the merge operation 140, a single database of zone information is created in the network switch, and the single database of zone information stores zone information only for those subsets or zones having a tag that matches the enforce tag set in the network switch. Thus, the merge operation creates a single zone database containing information about all of the zones or subsets that are permitted to communicate across two or more isolated communications networks.

The zoning interfaces present in standard Fibre Channel devices are used to create zones in Fibre Channel fabrics (FCFs). For inter-fabric device sharing, inter-fabric zones are named "LSAN_XYZ" or "lsan_XYZ", where XYZ represents a user-defined string, and the "LSAN_" or "lsan_" tag in the zone name indicates to a Fibre Channel router (FCR) that the zone is a special, inter-fabric zone known as an "LSAN zone." In an implementation, the "LSAN_" prefix is case insensitive.

Typically, an FCR obtains the zoning database from each edge fabric it is connected to, and parses that database for zones containing the "LSAN_" tag in the zone name. Each LSAN zone database entry consists of the LSAN zone name, a list of port World Wide Names (WWNs), and a device state record. The FCR typically accepts all LSAN zones, and compares the WWNs from the LSAN zones from a particular fabric with entries from another fabric. Matching entries define which devices can communicate via the FCR across fabrics, and those devices are considered to be in the same LSAN. This process of comparing WWNs from all LSAN zones in different fabrics is resource intensive.

In contrast, application of example operations 100 to zoning interfaces present in Fibre Channel devices provides for more efficient grouping of LSAN zones into LSANs. More specifically, an administrative station can be used to further define those zones identified as LSAN zones in zone databases for each of the FCFs, so that a FCR does not need to compare WWNs from all of the LSAN zones connected to the FCR and search for matching WWNs. Instead, using an enforce tag configured by a user in the FCR, the FCR can parse the user-defined LSAN zones in the zone databases of each of the FCFs connected to the FCR to determine which of the user-defined LSAN zones are permitted to communicate via that FCF. The FCF then merges the zone data for those LSAN zones that are permitted to communicate in a single, consolidated zone database.

In accordance with operation no, when LSAN zones are tagged, those LSAN zones that are desired to be grouped in the same LSAN are tagged with the same user-defined 'string "XYZ." In an implementation, an administrative station may be used to append a user-defined "tag" to each zone that has the "LSAN_" prefix. The same "tag" is used to identify those LSAN zones that are to communicate across FCFs. In an implementation, multiple "tags" may be defined in the same FCF. Further, devices connected to the FCF may be included in multiple LSAN zones.

In accordance with operation 120, the FCR is configured to enforce one or more "tags" known as "enforce tags." The "enforce tags" set in a FCR indicate those LSAN zones that are to be accepted by the FCR. Tags are user-defined strings in the LSAN zone name.

The enforce tag or tags of the FCR may be user-configurable via, for example, communications through an administrative station, although other methods of configuring the FCR may be employed. In an implementation, the FCR may be to be in a disabled state before configuring an enforce tag. Thus, when an FCR is configured to enforce a specific tag or tags, the FCR does not need to compare the WWNs from every zone with the "LSAN_" tag in the zone name.

Instead, in accordance with operation 130, the FCR uses the enforce tag to determine which devices are considered to be in the same LSAN and, thus, can communicate across isolated fabrics via the FCR. More specifically, the FCR parses the zone databases of each of the connected fabrics, comparing the user-defined string in the enforce tag stored in the FCR with the user-defined string appended to zones having the "LSAN_" prefix. This eliminates the resource intensive and time-consuming process of searching zone databases for zones having the "LSAN_" prefix, and then further searching for matching WWNs among those zones having the "LSAN_" prefix.

When the user-defined strings match, the FCR merges the associated LSAN zone in accordance with merge operation 140. More specifically, the FCR creates and stores a single database containing zone information for all zones permitted to communicate via the FCR (those zones that contain the same user-defined string specified in the FCR's enforce tag or tags). This merged database significantly increases the speed with which LSANs can be created, reduces the resources necessary to share devices across fabrics, and may provide enhanced security by limiting the amount of information required to create logical networks across isolated communications networks.

It should be appreciated that the enforce tag is persistently stored in the network switch so that it is preserved across re-boots and upgrades, and that each network switch can support multiple enforce tags. Additionally, the enforce tag may be used with FCR binding or Fabric Identification (FID) binding features to achieve improved scalability and performance over conventional LSAN zoning techniques. By combining the FCR and/or FID matrices with the enforce tag features, users can reduce cost and reduce resources in the metaSAN.

Figure 2:
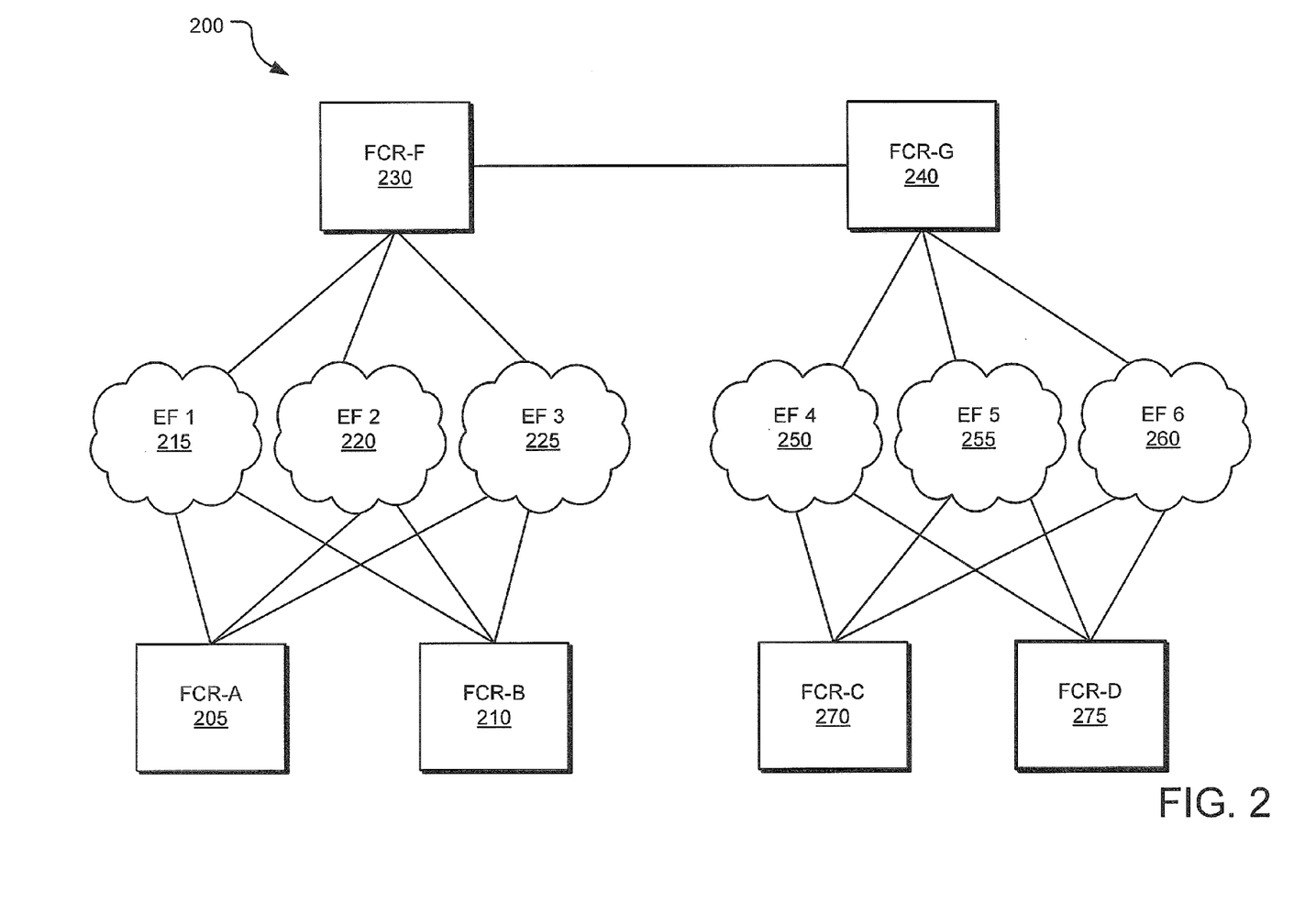
FIG. 2 illustrates an example of a series of isolated communications networks connected by switches that provide selective connectivity between subsets of the isolated networks using enforce tags.

FIG. 2 illustrates an example 200 of a series of isolated communications networks connected by switches that provide selective connectivity between subsets of the isolated networks using the enforce tag. In FIG. 2, two network switches, Fibre Channel router A (FCR-A) 205 and Fibre Channel router B (FCR-B) 210, are each connected to the same set of isolated communications networks—edge fabric 1 (EF1) 215, edge fabric 2 (EF2) 220, and edge fabric 3 (EF3) 225. A third network switch, Fibre Channel router F (FRF-F) 230, is in communication with EF1 215, EF2 220, and EF3 225 and another network switch, Fibre Channel router G (FCR-G) 240. The network switches FCR-A 205 and FCR-B 210 route locally. The network switch FCR-F 230 routes remotely across different sites using, for example, Internet protocol (IP).

Additionally, as shown in FIG. 2, two network switches, Fibre Channel router C (FCR-C) 270 and Fibre Channel router D (FCR-D) 275, are each connected to the same set of isolated communications networks—edge fabric 4 (EF4) 250, edge fabric 5 (EF5) 255, and edge fabric 6 (EF6) 260. The third network switch, Fibre Channel router G (FRF-G) 240, is in communication with EF4 250, EF5 255, and EF6 260 and another network switch, Fibre Channel router F (FCR-F) 230. The network switches FCR-C 270 and FCR-D 275 route locally. The network switch FCR-G 240 routes remotely across different sites using, for example, Internet protocol (IP).

Using LSAN tagging and one or more enforce tags, FCRs 205, 210, 230, 240, 270, and 275 need not accept all of the LSAN zones contained within connected fabrics. Access to the FCRs can be limited using an enforce tag or tags. Thus, the creation of LSAN zones across edge fabric 1 215, edge fabric 2 220, edge fabric 3 225, edge fabric 4 250, edge fabric 5 255, and edge fabric 6 260 requires fewer resources and is more efficient.

In the example illustrated in FIG. 2, several LSAN zones are defined in edge fabrics 215, 220, 225, 250, 255, and 260. Edge fabric 1 215, edge fabric 3 225, and edge fabric 5 255 each include an LSAN zone named "LSAN_abc." Edge fabric 2 220 and edge fabric 4 250 each include an LSAN zone named "LSAN_def." Edge fabric 4 250 and edge fabric 6 260 each include an LSAN zone named "LSAN_ghi."

In an implementation, FCR-A 205 is configured to enforce the LSAN zone name "LSAN_abc" using the enforce tag "LSAN_abc." In this configuration, FCR-A 205 will parse zone name information contained in each zone database of the connected edge fabrics and accept only zones that are named "LSAN_abc." Thus, because FCR-A 205 routes locally, FCR-A 205 will route only between edge fabric 1 215 and edge fabric 3 225 for LSAN zones named "LSAN abc." FCR-A 205 will merge the zone information for zones named "LSAN abc" from the zone databases for edge fabric 1 215 and edge fabric 3 225 into a single zone database stored in FCR-A 205. FCR-A 205 may also be configured to support multiple enforce tags.

In another implementation, FCR-B 210 is configured to enforce the LSAN zone name "LSAN_abc" using the enforce tag "LSAN_abc." In this configuration, FCR-B 210 will parse zone name information contained in each zone database of the connected edge fabrics and accept only zones with the name "LSAN_abc." Because FCR-B 210 routes locally, FCR-B 210 will route only between edge fabric 1 215 and edge fabric '225 for LSAN zones named "LSAN_abc." FCR-B 210 will merge the zone information for zones named "LSAN_abc" from the zone databases for edge fabric 1 215 and edge fabric 3 225 into a single zone database stored in FCR-B 210.

In another implementation, FCR-B 210 is configured to enforce the LSAN zone name "LSAN_def" using the enforce tag "LSAN_def." FCR-B 210 routes locally. In this configuration, FCR-B 210 will only parse zone name information contained in the zone databases of connected edge fabric 1 215, edge fabric 2 220, and edge fabric 3 225. Even though LSAN zones "LSAN_def" are defined in edge 2 220 and edge fabric 4 250, the FCR-B 210 will not route between edge fabric 220 and edge fabric 250 for LSAN zones named "LSAN_def." The resulting merged zone database stored in FCR-B 210 will include zone information for only the zone named "LSAN_def" defined in edge fabric 220.

However, if the enforce tag "LSAN_def" is set in either of the FCRs that route remotely, connectivity will be provided between edge fabric 2 220 and edge fabric 4 250, because the FCRs that route remotely are capable of routing across different sites using, for example, the IP protocol. When FCR-F 230 is configured to enforce "LSAN_def," FCR-F will parse zones from edge fabric 1 215, edge fabric 2 220, edge fabric 3 225 and those zones from edge fabric 4 250, edge fabric 5 255, and edge fabric 6 260 that are connected to FCR-G 240. Thus, FCR-F 230 will route only between edge fabric 2 220 and edge fabric 4 250 for LSAN zones named "LSAN_def" and FCR-F 230 will contain a single zone database containing zone information for LSAN zones named "LSAN_def" in edge fabric 2 220 and edge fabric 4 250. Similarly, when FCR-G 240 is configured to enforce "LSAN_def" FCR-G 240 will parse zone name information from zone databases for edge fabric 4 250, edge fabric 5 255, and edge fabric 6 260 as well as edge fabric 1 215, edge fabric 2 220, and edge fabric 3 225 that are connected to FCR-G 240 via FCR-F 230. Thus, FCR-F 240 will route only between edge fabric 220 and edge fabric 250 for LSAN zones named "LSAN_def" and FCR-G 240 will contain a single zone database containing zone information for LSAN zones named "LSAN_def" in edge fabric 2 220 and edge fabric 4 250.

In another implementation, FCR-B 210 is configured to enforce the LSAN zone name "LSAN_ghi" using the enforce tag "LSAN_ghi." FCR-B 210 routes locally. In this configuration, FCR-B 210 will only parse zones from connected edge fabrics edge fabric 1 215, edge fabric 2 220, and edge fabric 3 225. As LSAN zones "LSAN_ghi" are defined only in edge fabric 4 250 and edge fabric 6 260, FCR-B 210 will not route between edge fabric 4 250 and edge fabric 6 260 for LSAN zones named "LSAN_def."

In another implementation, FCR-C 270 is configured to enforce the LSAN zone name "LSAN_def" using the enforce tag "LSAN_def." FCR-C 270 routes locally. In this configuration, FCR-C 270 will only parse zone name information in the zone databases of connected edge fabrics edge fabric 4 250, edge fabric 5 255, and edge fabric 6 260. LSAN zones "LSAN_def" are defined in edge fabric 4 250 and edge fabric 6 260. Thus, the FCR-C 270 will route between edge fabric 4 250 and edge fabric 6 260 for LSAN zones named "LSAN_ def," and FCR-C 270 will contain a single zone database containing zone information for LSAN zones named "LSAN_def" in edge fabric 4 250 and edge fabric 6 260.

Instill another implementation, FCR-D 275 is configured to enforce the LSAN zone name "LSAN_abc" using the enforce tag "LSAN_abc." FCR-D 275 routes locally. In this configuration, FCR-D 275 will only parse zone information in zone databases from connected edge fabrics edge fabric 4 250, edge fabric 5 260, and edge fabric 6 265. LSAN zones "LSAN_abc" are defined in edge fabric 1215, edge fabric 3 225 and edge fabric 5 255. Thus, FCR-D 275 will not route between edge fabric 1 215, edge fabric 3 225, and edge fabric 5 255 for LSAN zones named "LSAN_def."

Thus, each FCR checks each zone it is in communication with for "lsan_<tag>" instead of "lsan_", and compares the "lsan_<tag>" to the enforce tag stored in the router to determine whether the FCR will provide connectivity for that LSAN zone. It should be understood that the LSAN zone names and enforce tags can be preserved across re-boots and upgrades. It should also be appreciated that multiple enforce tags can be configured on each FCR or switch.

While the enforce tag does improve the speed with which devices can be connected across isolated communications networks, some devices are sensitive to timeout and retry during discovery processes. For example, a host connected to a first network or fabric may be very sensitive to timeouts during the target discovery process when the target is connected to a second network or fabric. FCRs, for example, often take a long time to present proxy devices and setup path for proxy devices. Hardware and protocol constraints have prevented FCRs from improving the import/export process to satisfy those sensitive hosts. However, an FCR can treat a certain number of LSANs including those hosts and targets specially by always importing these targets to the hosts. While the enforce tag can be used to increase the speed and reduce the resources necessary to create a zone or LSAN zone so that the host and target device can communicate, a "speed tag" may be set in the switch connecting the networks, so that the host and target device are persistently connected. As a result, operations such as "boot over LSAN" operations are possible.

Figure 3:
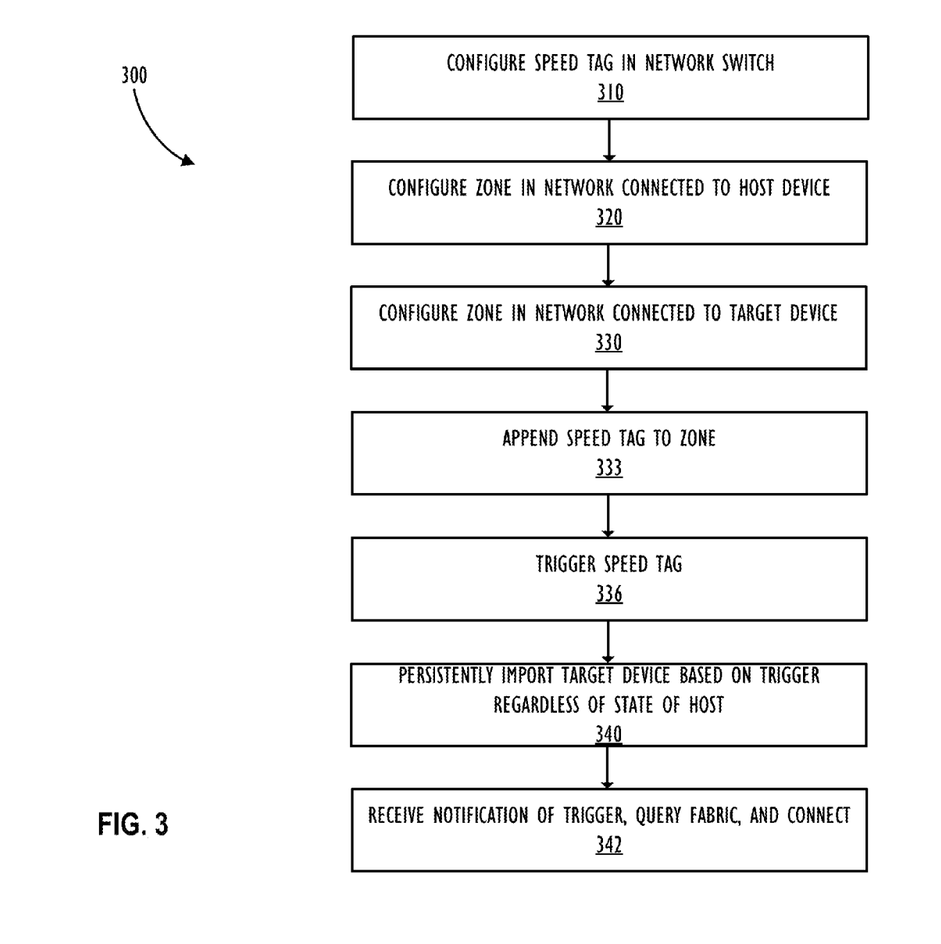
FIG. 3 illustrates example operations for creating a persistent connection between a two devices connected to isolated networks using a speed tag.

FIG. 3 illustrates example operations 300 for creating a persistent connection between a two devices connected to isolated networks using a speed tag. In configuration operation 310, a speed tag is configured in the network switch that connects a host device and a target device. In configuration operation 320, a zone or subset is configured in the network connected to the host device. In configuration operation 330, a zone or subset is configured in the network connected to the target device. In import operations 336 and 340, the speed tag is "triggered" or enabled (operation 336), persistently importing the target device (operation 340). It should be appreciated that the speed tag can be triggered in a variety of ways, for example, by toggling (taking a device off-line and then back on-line) the host device or the target device. Once the target device has been imported, the target device remains imported, regardless of the state of the host. The target device is unimported only when the zone or subset that it shares with the host device is removed, or if the target device is taken offline.

In an implementation, example operations 300 can be applied to provide a connection between a target device in one Fibre Channel fabric (FCF or fabric) and host device in a different Fibre Channel fabric. For example, in accordance with operation 310, the Fibre Channel router (FCR) connecting the fabrics that include the host device and the target device would be configured with a speed tag. In an implementation, the speed tag may be the tag "super;" however, it should be understood that the speed tag will depend upon the zoning configuration and protocols in use.

In accordance with operation 320, an LSAN zone would be created in the fabric connected to the host device. In accordance with operation 320, a corresponding LSAN zone would be created in the fabric connected to the target device. In an implementation, as shown in operation 333, the LSAN zone containing the target device, the LSAN zone containing the host device, or both LSAN zones may be appended with a speed tag such as "super." The speed tag may be triggered or enabled by bringing the host device or the target off-line and on-line (shown in operation 336), causing the target device to be persistently imported to the host (shown in operation 340). Once the speed tag is triggered, the host will "see" the target device unless the target device is taken offline or the LSAN zone is removed. More specifically, when the speed tag is triggered, the host receives notification that the tag was triggered (shown in operation 342), the host queries the name server of the associated fabric, and establishes a connection with the target device via port login (PLOGI).

It should be appreciated that, in an implementation, once the speed tag is triggered, the host device will always see the target device as "imported." Further, the PID of the target device will remain in the name servers of the host device's associated fabric, even when the host device is brought down. Thus, even when a host is very sensitive to timeout issues, the host device will have fast access to the target device because the host device can "see" the target device as long as the target device is online. As a result, the host's port login (PLOGI) to the target device will be successful whenever the target device is online.

The status of these targets in the special LSANs remains Imported, and the name server in the edge fabric always contains the PID of these targets. As a result of the specialized LSAN Speed tag, sensitive hosts are able to do discovery faster on these targets.

Figure 4:
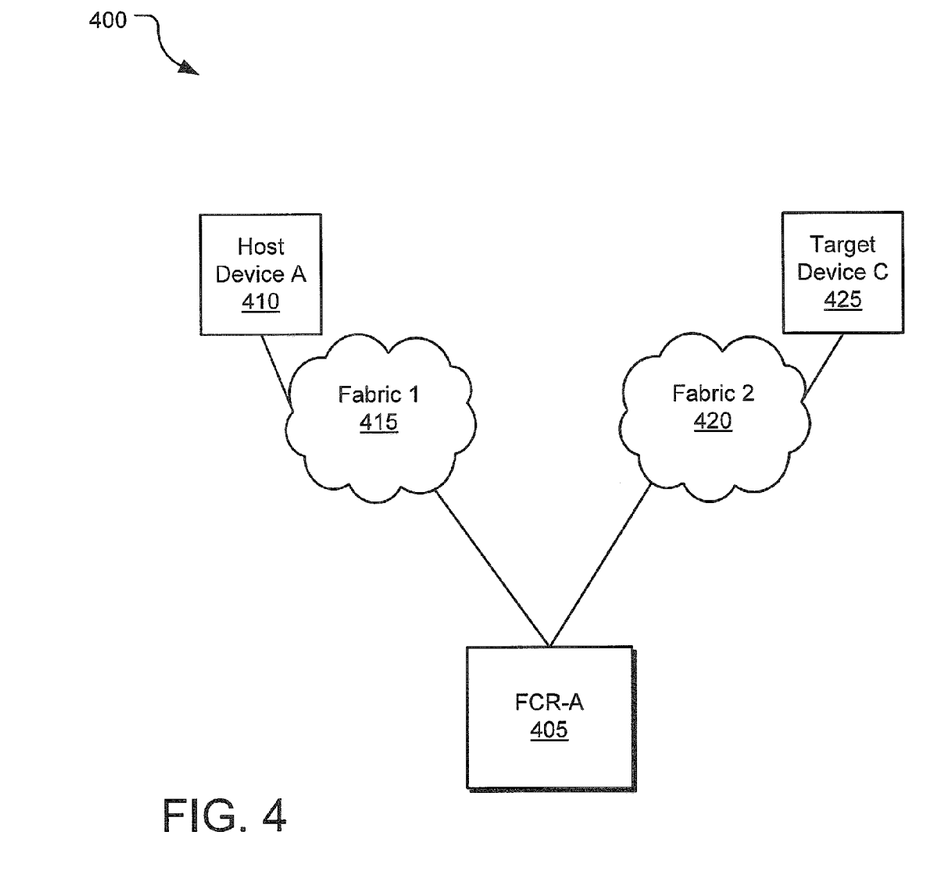
FIG. 4 illustrates an example series of isolated communications networks in which two devices on different isolated communications networks are persistently connected using a speed tag.

FIG. 4 illustrates an example series 400 of isolated communications networks in which two devices on different isolated communications networks are persistently connected using a speed tag. In FIG. 4, Host Device A 410 is a very sensitive host that needs fast access to target devices. Additionally, Host Device A 410 is in communication with Target Device C 425. Host Device A 410 and Target Device C 425 are connected to different Fibre Channel fabrics, Fabric 1 415 and Fabric 2 420, respectively.

A speed tag is set in FCR-A 405 through an administrative station in communication with FCR-A 405. In an implementation, the Speed LSAN tag is defined as "super."

A zone, for example lsan_f1_f2 (a, c), is configured in Fabric 1 415. The zone naming convention preferably defines the devices that are to be connected (host a and target device c); the fabric with which the zone is associated (f1); and the fabric with which the target device is associated (f2). In an implementation, the host zone may include a speed tag, such as "super."

Another zone, for example lsan_f2_f1 (a,c) is configured in Fabric 2 420. The zone naming convention preferably defines the devices that are to be connected (host a and target device c); the fabric with which the zone is associated (:f2); and the fabric with which the host device is associated (f1). In an implementation, the target zone may include a speed tag such as "super." For example, in this implementation, the speed tagged zone is lsan_super_:f82_f1 (a,c). In another implementation, the target zone does not need to include any additional tags.

Once the speed tag is triggered, for example, by toggling the host device or the target device, the target device will be imported into the host device so that port login from the host device to the target device will be successful as long as the target device is online.

It should be appreciated that speed tags may be configured using, for example, an administrative console interface. Additionally, it should be appreciated that speed tags do not provide for the merging of zones. Rather, the speed tag provides for the creation of a specialized logical zone that includes devices that are associated with isolated communications networks without merging the networks themselves.

In one implementation, processor-readable firmware and associated circuitry contained within a controller, such as a Fibre Channel controller can be employed to implement the enforce tag and/or speed tag using a processor-readable storage media that encodes processor-executable instructions for executing a computing process on a computer.

Figure 5:
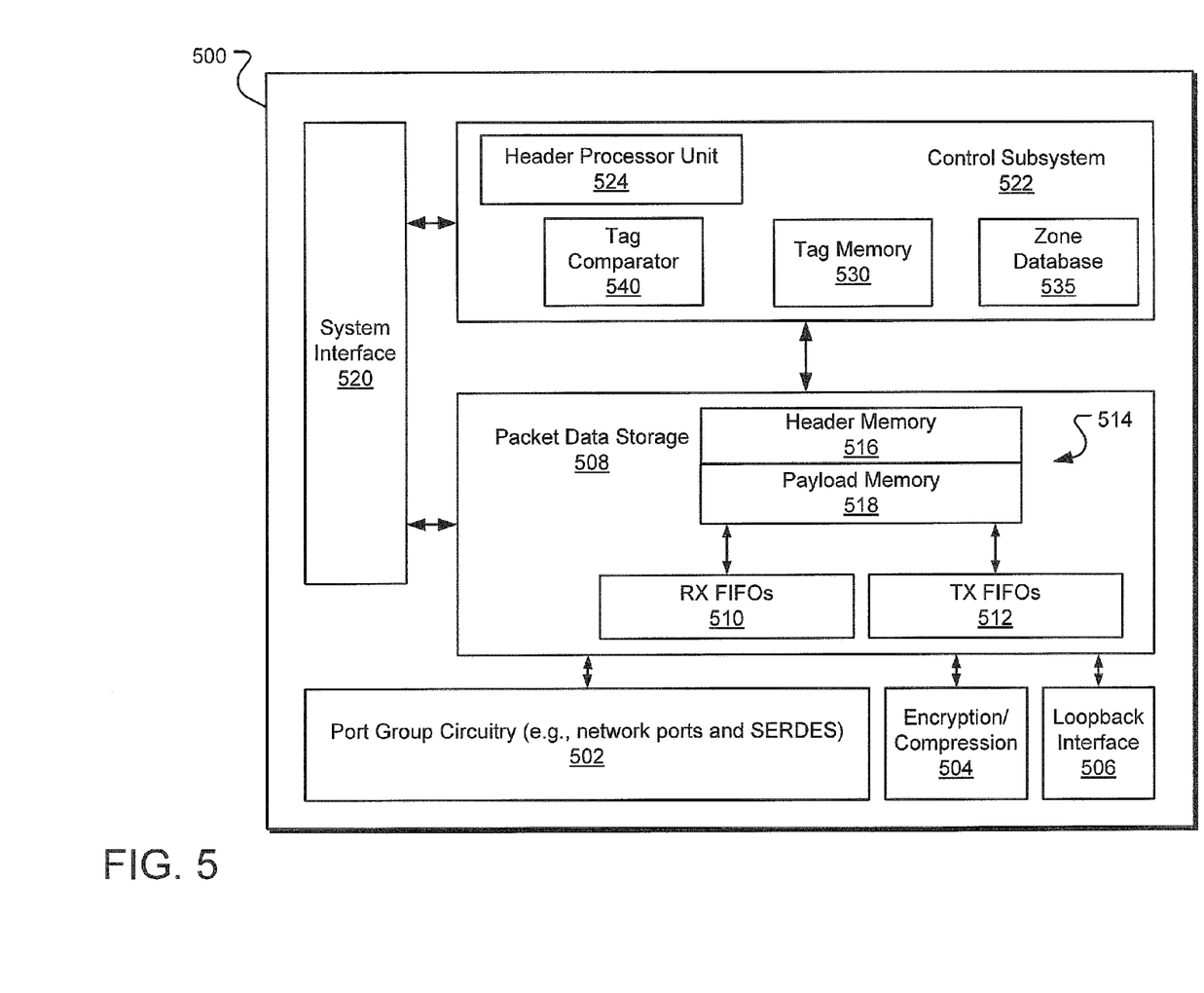
FIG. 5 illustrates an architecture of an example Fibre Channel Controller in which the speed and enforce tags may be implemented.

FIG. 5 illustrates an architecture of an example Fibre Channel Controller 500 in which the LSAN tagging features can be implemented. Port group circuitry 502 includes the Fibre Channel ports and Serializers/Deserializers (SERDES) for the network interface. Data packets are received and transmitted through the port group circuitry 502 during operation. Encryption/compression circuitry 504 contains logic to carry out encryption/compression or decompression/decryption operations on received and transmitted packets. The encryption/compression circuitry 504 contains logic to carry out encryption/compression or decompression/decryption operations on received and transmitted packets. The encryption/compression circuitry 504 is connected to 6 internal ports and can support up to a maximum of 65 Gbps bandwidth for compression/decompression and 32 Gbps bandwidth for encryption/decryption, although other configurations may support larger bandwidths for both. A loopback interface 506 is used to support Switched Port Analyzer (SPAN) functionality by looping outgoing packets back to packet buffer memory.

Packet data storage 508 includes receive (RX) FIFOs 510 and transmit (TX) FIFOs 512 assorted receive and transmit queues. The packet data storage 508 also includes control circuitry (not shown) and centralized packet buffer memory 514, which includes two separate physical memory interfaces: one to hold the packet header (i.e., header memory 516) and the other to hold the payload (i.e., payload memory 518). A system interface 520 provides a processor within the switch with a programming and internal communications interface. The system interface 520 includes without limitation a PCI Express Core, a DMA engine to deliver packets, a packet generator to support multicast/hello/network latency features, a DMA engine to upload statistics to the processor, and top-level register interface block.

A control subsystem 522 includes without limitation a header processing unit 524 that contains switch control path functional blocks. All arriving packet descriptors are sequenced and passed through a pipeline of the header processor unit 524 and filtering blocks until they reach their destination transmit queue. The header processor unit 524 carries out L2 Switching, Hard Zoning, SPAN support, and Encryption/Decryption. The control subsystem 522 also includes tag memory 530 that interfaces with the system interface 520 and the header processing unit 524 to store enforce and/or speed tag configurations. The control subsystem 522 also includes a tag comparator 540 that interfaces with the system interface 520 and the header processing unit 524 and compares received enforce and/or speed tag information with the enforce and/or speed tag information stored in tag memory 530. Additionally, the control subsystem may include a zone database 535 for storing one or more merged zone databases.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A device comprising:
   a memory for storing tags;
   a plurality of ports;
   logic coupled to said memory and configured to store an enforce tag in said memory, wherein said enforce tag indicates merging zones with respective like enforce tags to the exclusion of zones without a like enforce tag and where said enforce tag is used with zones desired to be merged; and
   logic coupled to said memory and communicatively coupled to said plurality of ports and configured to recognize said enforce tag to selectively merge zones of isolated fabrics without merging the isolated fabrics, wherein zones are selectively merged based on a comparison of respective enforce tags of zones from the isolated fabrics with said enforce tag stored in the device.

2. A device according to claim 1, wherein the device is configurable by a user.

3. A device according to claim 1, wherein the zones are LSAN zones tagged by a user-defined string.

4. A device according to claim 1, wherein there are a plurality of enforce tags, and
   wherein said logic to recognize said enforce tag to selectively merge zones of isolated fabrics without merging the isolated fabrics is configured to recognize said plurality of enforce tags to selectively merge zones of isolated fabrics without merging the isolated fabrics for each of said plurality of enforce tags.

5. A device according to claim 1, wherein the device is a fabric router.

6. A device according to claim 5, wherein when said fabric router is only directly connected to a plurality of isolated fabrics, said logic to recognize said enforce tag to selectively merge zones of isolated fabrics without merging the isolated fabrics operates only on the directly connected isolated fabrics.

7. A device according to claim 5, wherein when said fabric router is directly connected to a single isolated fabric and is directly connected to another fabric router which is directly connected to another isolated fabric,
   said logic to recognize said enforce tag to selectively merge zones of isolated fabrics without merging the isolated fabrics operates on the directly connected isolated fabric and the another isolated fabric directly connected to the another fabric router.

8. A device according to claim 5, wherein when said fabric router is directly connected to a plurality of isolated fabrics and is directly connected to another fabric router which is directly connected to at least one isolated fabric, said logic to recognize said enforce tag to selectively merge zones of isolated fabrics without merging the isolated fabrics operates on the plurality of directly connected isolated fabrics and the at least one isolated fabric directly connected to the another fabric router.

9. A method, comprising:
   storing, in a memory of an apparatus, an enforce tag to indicate zones desired to be merged, said enforce tag indicating merging zones with respective like enforce tags to the exclusion of zones without a like enforce tag; and selectively merging zones of isolated fabrics without merging the isolated fabrics based on a comparison of respective enforce tags of zones from the isolated fabrics with said enforce tag.

10. A method according to claim 9, wherein the zones of isolated fabrics are merged when the zones of isolated fabrics share a user-defined string.

11. A method according to claim 9, further comprising:
merging the zones of isolated fabrics only when in communication with a fabric router having a matching enforce tag.

12. A method according to claim 9, wherein a plurality of enforce tags are stored in the memory, and
wherein selectively merging zones of isolated fabrics is done for each of the plurality of enforce tags.

13. A method according to claim 9, wherein said method is performed on the apparatus, the apparatus being a fabric router.

14. A method according to claim 13, wherein when the fabric router is only directly connected to a plurality of isolated fabrics, the operation of selectively merging zones of isolated fabrics without merging the isolated fabrics is performed only on the directly connected isolated fabrics.

15. A method according to claim 13, wherein when the fabric router is directly connected to a single isolated fabric and is directly connected to another fabric router which is directly connected to another isolated fabric, the operation of selectively merging zones of isolated fabrics without merging the isolated fabrics is performed on the directly connected isolated fabric and the another isolated fabric directly connected to the another fabric router.

16. A method according to claim 13, wherein when the fabric router is directly connected to a plurality of isolated fabrics and is directly connected to another fabric router which is directly connected to at least one isolated fabric, the operation of selectively merging zones of isolated fabrics without merging the isolated fabrics is performed on the plurality of directly connected isolated fabrics and the at least one isolated fabric directly connected to the another fabric router.

* * * * *